2,877,278
Patented Mar. 10, 1959

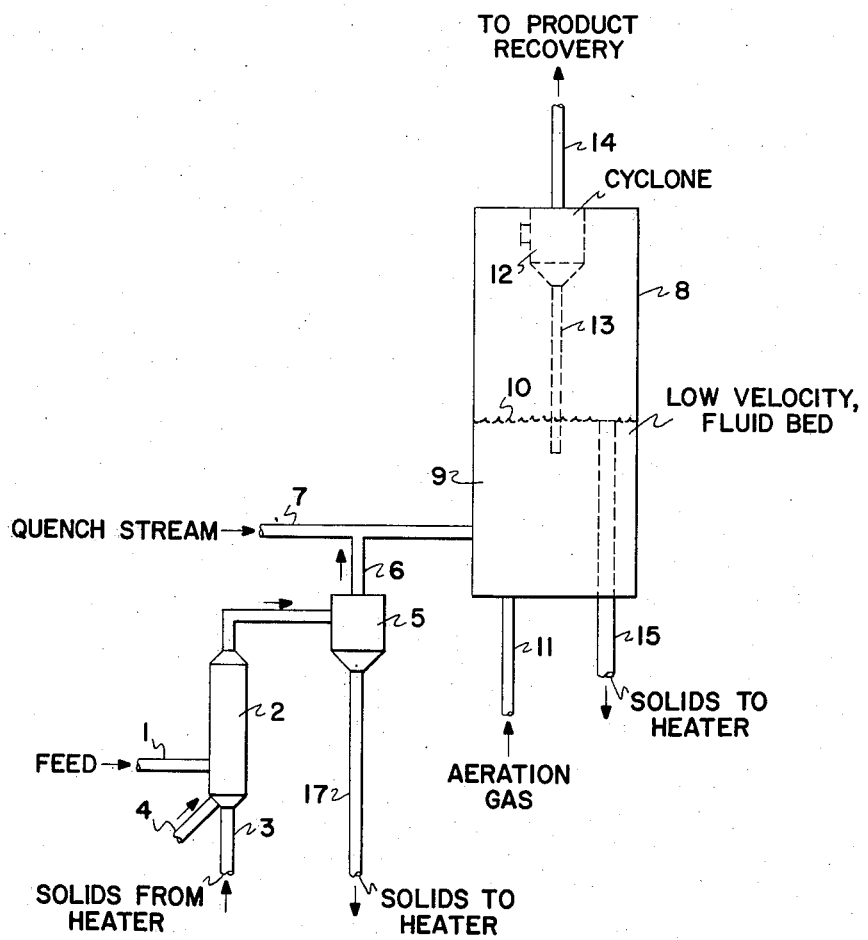

United States Patent Office

2,877,278
FLUID BED TRAP FOR CONVERSION SYSTEMS

John Frederick Moser, Jr., Baton Rouge, La., assignor to Esso Research and Engineering Company, a corporation of Delaware Application February 4, 1957, Serial No. 637,988

6 Claims. (Cl. 260—680)

This invention relates to improvements in the recovery of gaseous products from the high temperature conversion of hydrocarbons, particularly hydrocarbon oils. More particularly it relates to an improved method for preventing the loss of solids utilized in the form of a fluidized dispersed suspension in transfer line reaction systems of the nature indicated.

In the prior art various proposals have been made for carrying out reactions by contacting gases, vapors and liquids with particulate solids flowing in the form of a fluidized, dispersed suspension in a transfer line. A particular application of this general technique relates to the coking or thermal conversion of heavy hydrocarbon oils to low molecular weight normally gaseous hydrocarbon unsaturates and coke, generally conducted at a temperature in the range of 1100° to 1800° F.

In the coking reactions particularly, the desired conversion ordinarily is accomplished by contacting the material to be converted with fluidized, i. e., a rapidly flowing stream, or dispersed suspension of preheated, finely divided, usually non-catalytic, solid particles such as coke, sand, etc. (As to nomenclature see Industrial and Engineering Chemistry, vol. 41, page 1249.) These particles may vary in size but ordinarily they range between about 20 to 800 micron particle diameter with a consequent wide difference in actual particle size in any given sample.

Heavy hydrocarbon oil feeds suitable for the process are reduced crudes, vacuum bottoms, pitch, asphalt, other heavy hydrocarbon residua or mixtures thereof. Typically, such feeds can have an initial boiling point of about 700° F., an A. P. I. gravity of about 0° to 20°, e. g. 1.9°, and a Conradson carbon content of about 5 to 40 wt. percent. (As to Conradson carbon residue see A. S. T. M. Test D-189-41.)

One of the critical features of such a transfer line operation is efficient recovery of the solids. Since all of them can undesirably pass through the vapor-solids separation zone, typically a cycline, momentary upsets can result in rather large solids losses. These losses in addition can severely foul the product recovery system and necessitate shutdowns.

This invention provides an improved method of overcoming these difficulties. The method comprises quenching the gaseous products separated from the solids downstream of the cyclone to a controlled extent, feeding the thus quenched stream into a low velocity, dense, turbulent, fluidized bed of particulate solids to remove the solids not separated in the cyclone and then withdrawing the gaseous products from the dense, turbulent, fluidized bed.

The quenching material utilized can be an extraneous stream of cool solids, liquid, or gas, or more preferably a vaporizable recycle liquid condensed from the effluent from the dense bed. The quenching is conducted at a temperature sufficient to prevent further reaction, but insufficient to condense more than a minor amount, generally less than 10 wt. percent of the gaseous products. This temperature will vary with different feed materials, e. g., in the treatment of gas oils it can be about 800° F., whereas in the treatment of naphthas it can be 500° F. or less.

The thus quenched stream enters a low velocity, dense, turbulent, fluidized bed, i. e., the fluidizing gas has a superficial velocity of 0.5 to 4 ft./sec. The particulate solids utilized in the dense, turbulent, fluidized bed are preferably the same as those utilized in the conversion system, although different solids can be utilized. The temperature in the dense bed is about the same as the quenched stream. In most cases, no extra solids would be required, the normal solids losses maintaining inventory and the quench stream providing the necessary cooling. In some cases (particularly when higher amounts of the reactor effluent are to be condensed), it is desirable to add extraneous, cooled solids either from the stripper or the heater. Predominantly all (99+%) the solids not separated in the original cyclone are thus removed. The gaseous products are then withdrawn from the fluidized bed conveniently through a second vapor-solids separation zone, usually a cyclone.

This invention will be better understood by reference to the flow diagram shown in the drawing.

Referring now to the flow diagram, a heavy residual petroleum oil, a South Louisiana reduced crude, at a temperature of 650° F. is introduced through line 1 into transfer line reactor 2. Hot coke solids at a temperature of 1600° F. from a heating zone, not shown, are also fed into the transfer line reactor through line 3. Fluidizing gas, e. g., steam, is fed in through line 4. The total contact time in the transfer line is about 0.1 to 2.0 seconds so as to obtain the desired reaction to ethylene, propylene, butadiene and other unsaturates. The effluent of coke particles and gaseous products then enter cyclone separator 5. The gaseous products with some fines are withdrawn overhead through line 6, whereas most of the solids are removed through line 17 to a heating zone, not shown. A quench stream of recycle oil at a temperature of 200° F. is fed into line 6 through line 7 and cools the gaseous products to a temperature of 800° F. to 1000° F. The further reaction is inhibited and about 1 to 2 weight percent of the products are condensed.

The thus quenched stream is fed into solids recovery zone 8. Zone 8 contains a dense, turbulent, fluidized bed 9 of coke particles, having an upper level 10. Fluidizing gas such as steam enters through line 11. The quench stream entering fluidized bed 9 contains some fines which are removed in the bed. The gaseous products and a smaller amount of still entrained solids pass through cyclone 12 from which the solids are further separated. The solids are returned to fluid bed 9 through dipleg 13 whereas the gaseous products are withdrawn overhead through line 14. As the solids in the fluid bed 9 build up they overflow into conduit 15 and are returned for reuse in the system. Conveniently, at least a portion of them are recycled to the heating zone and re-used for supplying heat for the system. The solids in line 17 can be utiilzed in a similar manner.

The improved method of preventing solids loss of this invention is applicable to other systems than the conversion of heavy oils to chemicals. It can be applied to the conversion of gas oils, naphthas and other petroleum fractions. It also has utility to similar short time reactions as the dehydrogenation of butane and similar systems which use finely divided catalysts.

The conditions of transfer line coking of heavy hydrocarbon oils for chemicals are elaborated upon in the tables presented below because of the importance of this invention in that process. The conditions in the heater for a system of this nature are also indicated. In the heater coke particles can be combusted in the presence of an oxygen containing gas or extraneous fuels can be burnt or indirect heat exchange used to bring the solids up to the desired temperature.

*Conditions in transfer line reactor*

|  | Broad Range | Preferred Range |
|---|---|---|
| Temperature, °F | 1,100–1,800 | 1,400–1,600 |
| Superficial Velocity of Fuidizing Gas in Transfer Line Reactor, ft./sec. | 5–150 | 30–75 |
| Contact Time, sec. | 0.01–5.0 | 0.2–1.0 |

*Conditions in heater*

|  | Broad Range | Preferred Range |
|---|---|---|
| Temperature, °F | 1,200–2,300 | 1,600–1,800 |
| Superficial Velocity of Fuidizing Gas, ft./sec. | 0.2–150 | 30–75 |

The advantages of the system of this invention are apparent to the skilled in the art. The loss of solids and their fouling of the recovery system are prevented. Heat economy is effected since the main solids circulating stream is not quenched. In addition in most cases some of the very heavy coke precursors in the reactor effluent are conveniently condensed and removed on the coke, thereby preventing coking in the lines downstream.

The principal advantage of the fluid bed over a second cyclone is in upset operation when large slugs of solids are lost from the first cyclone. Here, a second cyclone would also be badly overloaded with solids and would not effect efficient solids recovery. On the other hand, the low velocity fluid bed would be virtually unaffected, since the vapor velocity would not be changed and hence the losses from the bed would not be changed. In normal operation the fluid bed operating at a low linear velocity gives much more efficient recovery of solids than would merely a second cyclone.

It is to be understood that this invention is not limited to the specific examples which have been offered merely as illustrations and that modifications may be made without departing from the spirit of the invention.

What is claimed is:

1. In a process of converting a hydrocarbon oil to lower molecular weight, normally gaseous, unsaturated hydrocarbons and coke by contacting the hydrocarbon oil with a fluidized, dispersed suspension of hot particulate solids and separating the gaseous products from solids in a vapor solids separating zone, the improvement which comprises the steps of quenching the separated gaseous products at a temperature sufficient to prevent further reaction but insufficient to condense more than a minor amount of the gaseous products; feeding the quenched stream into a dense, turbulent, fluidized bed of particulate solids at about the same temperature as the quenched stream to further remove therefrom solids not separated in the vapor solids separation zone and withdrawing gaseous products from the dense, turbulent, fluidized bed.

2. The process of claim 1 in which the vapor solids separation zone is a cyclonic separation zone.

3. The process of claim 2 in which the particulate solids are coke solids.

4. The process of claim 3 in which the hydrocarbon oil is a heavy petroleum oil.

5. The process of claim 3 in which the gaseous products are quenched and condensed to an extent less than 10 weight percent.

6. The process of claim 3 in which the conversion temperature is in the range of 1100° to 1800° F.

References Cited in the file of this patent

UNITED STATES PATENTS

| 2,376,191 | Roetheli et al. | May 15, 1945 |
| 2,422,501 | Roetheli | June 17, 1947 |
| 2,734,020 | Brown | Feb. 7, 1956 |
| 2,768,127 | Kimberlin et al. | Oct. 23, 1956 |